(12) United States Patent
Lee et al.

(10) Patent No.: US 7,465,503 B2
(45) Date of Patent: Dec. 16, 2008

(54) MOLDING MATERIAL FOR FUEL CELL SEPARATOR AND METHOD FOR PREPARING THE SAME

(75) Inventors: Ho Sub Lee, Daejeon (KR); Jeong Heon Kim, Yuseong-gu (KR)

(73) Assignee: Hankook Tire Co., Ltd., Seoul (KR)

( * ) Notice: Subject to any disclaimer, the term of this patent is extended or adjusted under 35 U.S.C. 154(b) by 250 days.

(21) Appl. No.: 11/157,009

(22) Filed: Jun. 20, 2005

(65) Prior Publication Data

US 2005/0288425 A1 Dec. 29, 2005

(30) Foreign Application Priority Data

Jun. 19, 2004 (KR) .................. 10-2004-0045888

(51) Int. Cl.
*H01M 8/00* (2006.01)
*H01M 8/02* (2006.01)
*B32B 27/04* (2006.01)
*B32B 27/20* (2006.01)
*B32B 27/38* (2006.01)
*C08L 63/00* (2006.01)
*C08K 3/04* (2006.01)

(52) U.S. Cl. .................. 429/12; 429/129; 428/408; 428/413; 523/468; 524/495

(58) Field of Classification Search .................. 428/332, 428/408, 413; 429/12, 129; 523/440, 468; 524/495

See application file for complete search history.

(56) References Cited

U.S. PATENT DOCUMENTS

2003/0175571 A1* 9/2003 Kawano et al. ................ 429/34
2004/0253502 A1* 12/2004 Shibata et al. ................ 429/35
2005/0142413 A1* 6/2005 Kimura et al. ................ 429/34

FOREIGN PATENT DOCUMENTS

WO    WO 03/079475 A1 *  9/2003

OTHER PUBLICATIONS

Brabender® Planetary Mixer brochure (Apr. 2006).*

* cited by examiner

*Primary Examiner*—Michael J Feely
(74) *Attorney, Agent, or Firm*—Jordan and Hamburg LLP

(57) ABSTRACT

Disclosed herein is a method for preparing a molding material for a fuel cell separator by dissolving an epoxy resin, a hardener and other additives in acetone and mixing a planar expanded graphite powder with the solution. Further disclosed are a molding material prepared by the method and a fuel cell separator produced from the molding material. The fuel cell separator shows very low gas permeability, superior electrical conductivity, sufficient strength, and maximized uniformity throughout the overall structure of the finished product.

7 Claims, 4 Drawing Sheets

MOLDING MATERIAL FOR FUEL CELL SEPARATOR AND METHOD FOR PREPARING THE SAME

BACKGROUND OF THE INVENTION

1. Field of the Invention

The present invention relates to a molding material for a fuel cell separator, a method for preparing the material, a fuel cell separator produced from the molding material, and a fuel cell comprising the separator.

A stack, the most important constituent unit of a fuel cell, is composed of a membrane electrode assembly and a bipolar plate called a 'separator'. The separator is a core element acting as a passage for supplying hydrogen and oxygen to the membrane electrode assembly and transferring electrons generated by a catalytic reaction, and at the same time, playing a role in separating unit cells so as to maintain insulation between the unit cells. For these reasons, fuel cell separators are required to have basic characteristics, such as flexural strength, gas permeability and electrical conductivity, to some extent.

2. Description of the Related Art

Metal separators have been used in conventional fuel cells, but have problems of severe corrosion at contact sites with electrolytes, thus deteriorating the performance and shortening the service life of the fuel cells. Under such circumstances, separators made of carbon materials have drawn attention in terms of superior corrosion resistance. Graphite is the most representative carbon material. Graphite is superior in both corrosion resistance and chemical resistance, and shows high electrical conductivity comparable to metals. For these reasons, graphite separators are currently in the spotlight as substitutes for metal separators.

However, since graphite is difficult to process into a desired shape, it incurs much higher processing costs than the price of graphite alone, which is economically disadvantageous in terms of the overall production costs. Accordingly, there have been introduced carbon composite separators that can be molded into desired shapes while maintaining the inherent characteristics of graphite, including superior chemical resistance and electrical conductivity.

These carbon composite separators are generally produced by mixing a graphite powder and a thermosetting or thermoplastic resin, and molding the mixture via compression molding or injection molding. Graphite powders commonly used for this purpose are divided into spherical graphite powders and planar graphite powders in terms of their shape, and natural graphite powders and expanded graphite powders in terms of their preparation manner. In addition, as thermosetting resins, unsaturated polyester resins, epoxy resins, and phenol-based resins are used.

The use of spherical graphite powders or natural graphite powders in the production of fuel cell separators causes problems of low gas permeability, low electrical conductivity and poor strength characteristics. Particularly, additional use of powdery resins enables dry mixing and thus the overall procedure is advantageously simplified. However, the use of powdery resins degrades the dispersibility of the raw materials, causing heterogeneity in the finished products. Further, additives for improving the performance of the final products have extremely limited applicability. As a result, the abovementioned problems lead to the manufacture of fuel cell stacks with low energy efficiency.

SUMMARY OF THE INVENTION

The present inventors have earnestly and intensively conducted research to solve the aforementioned problems, and as a result, have found that a mixture obtained by dissolving an epoxy resin, a hardener, and other additives in acetone and mixing a planar expanded graphite powder with the solution can be used as a molding material for a fuel cell separator with very low gas permeability, superior electrical conductivity, sufficient strength, and maximized uniformity of physical properties throughout the overall structure of the finished product. The present invention has been achieved based on these findings.

It is an object of the present invention to provide a method for preparing a molding material for a fuel cell separator with very low gas permeability, superior electrical conductivity, sufficient strength, and maximized uniformity of physical properties throughout the overall structure of the finished product, by combining optimum selection of raw materials and suitable processes for the raw materials.

It is another object of the present invention to provide a fuel cell separator produced using a molding material prepared by said method.

It is yet another object of the present invention to provide a fuel cell comprising the fuel cell separator.

In accordance with one aspect of the present invention, there is provided a method for preparing a molding material for a fuel cell separator by dissolving an epoxy resin, a hardener, a hardening accelerator and a binder in acetone, mixing a graphite powder with the solution, followed by drying and grinding.

In accordance with another aspect of the present invention, there is provided a molding material for a fuel cell separator prepared by the method.

In accordance with another aspect of the present invention, there is provided a fuel cell separator produced using the molding material.

In accordance with yet another aspect of the present invention, there is provided a fuel cell comprising the fuel cell separator.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
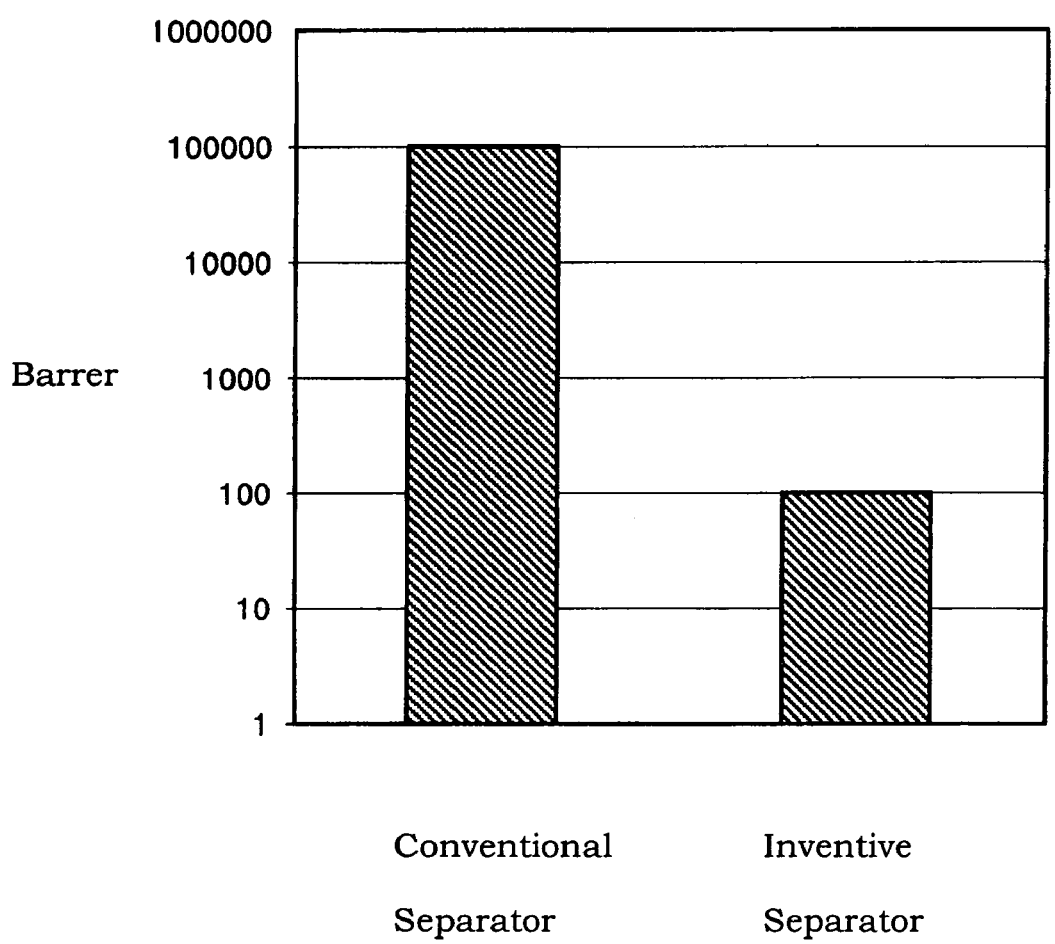
FIG. 1 is a graph comparing the gas permeability of a fuel cell separator produced by a method of the present invention with that of a conventional fuel cell separator.
Figure 2:
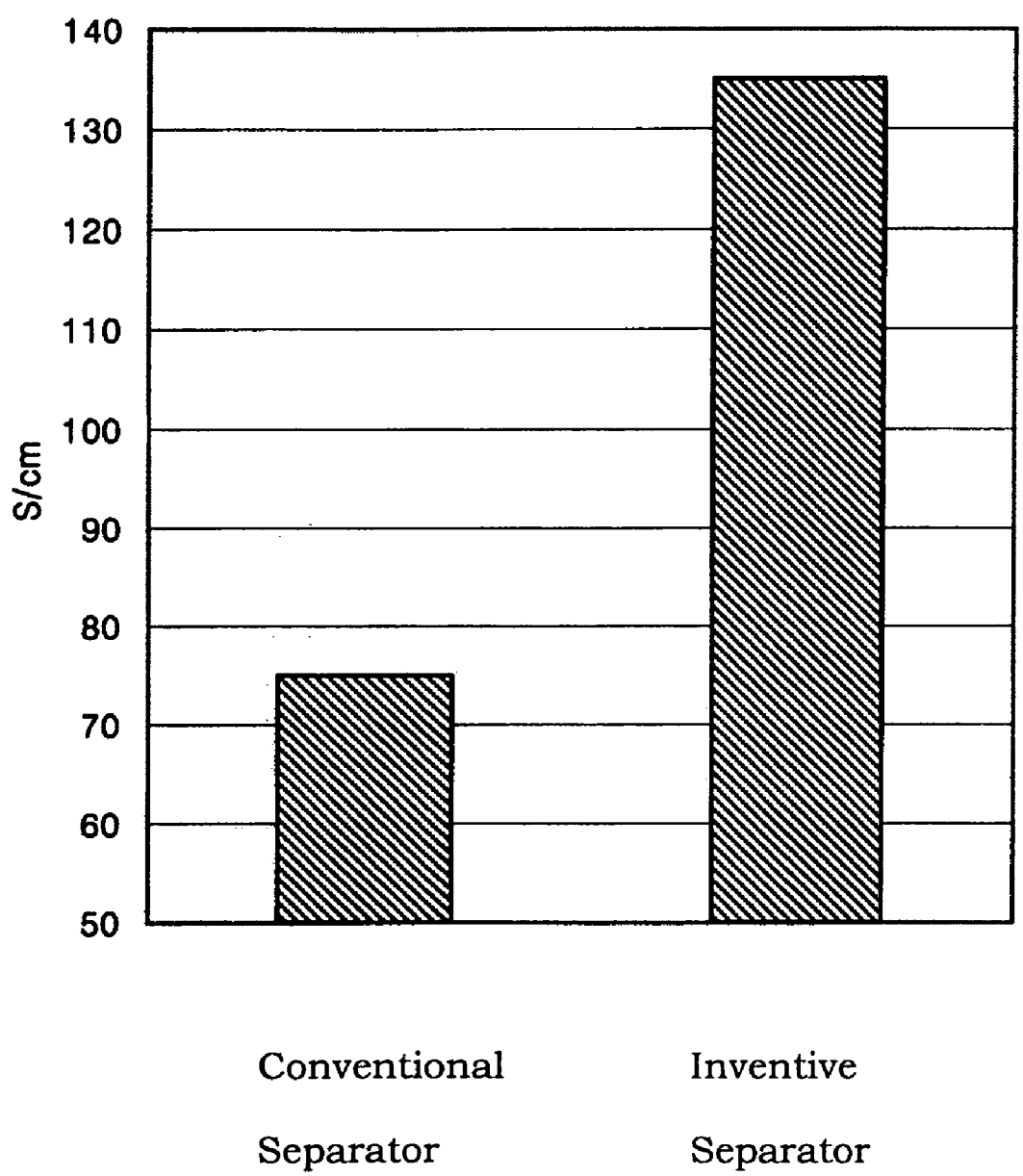
FIG. 2 is a graph comparing the electrical conductivity of a fuel cell separator produced by a method of the present invention with that of a conventional fuel cell separator.
Figure 3:
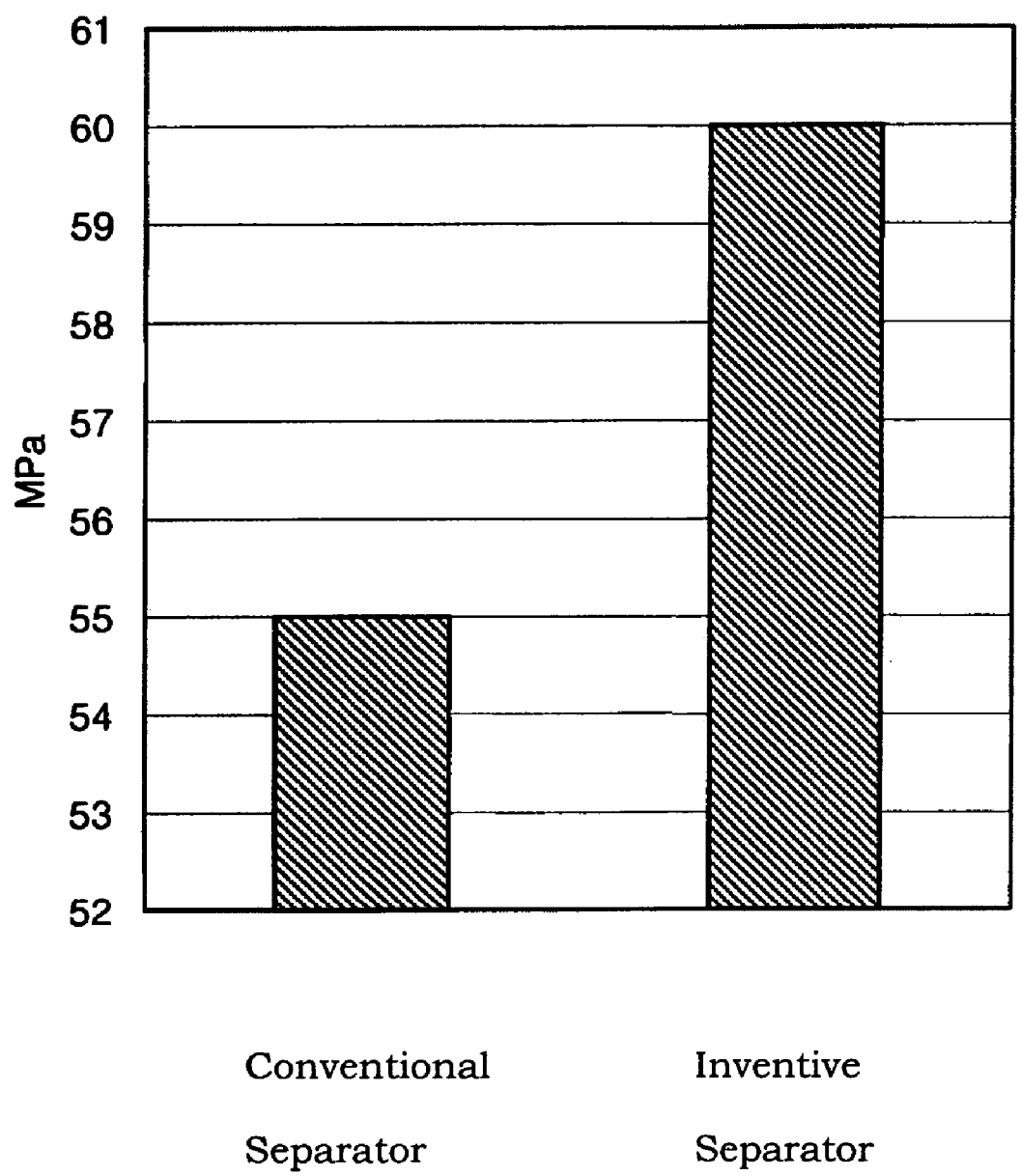
FIG. 3 is a graph comparing the flexural strength of a fuel cell separator produced by a method of the present invention with that of a conventional fuel cell separator.
Figure 4:
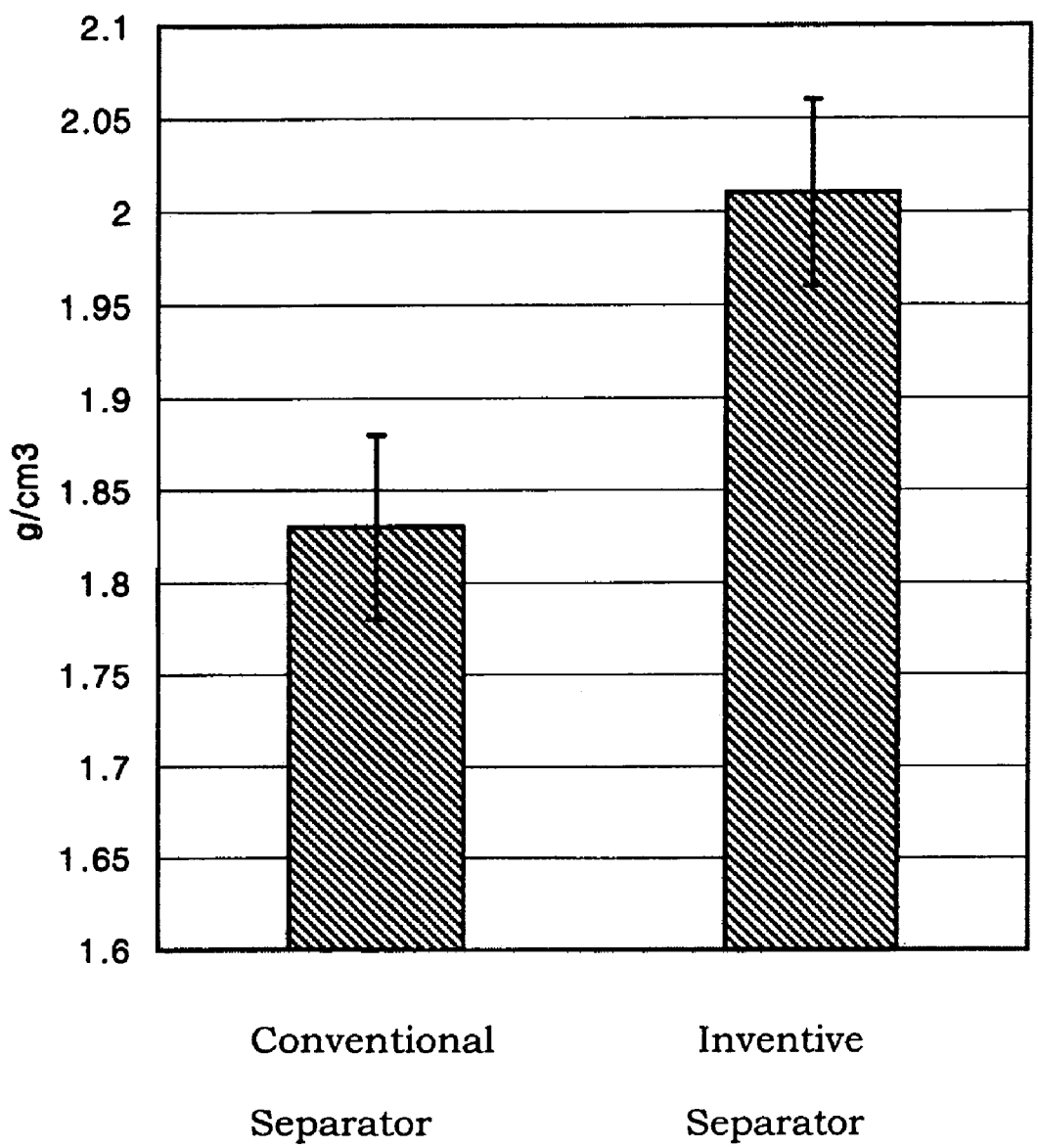
FIG. 4 is a graph comparing the density of a fuel cell separator produced by a method of the present invention with that of a conventional fuel cell separator.

The present invention provides a molding material for a fuel cell separator comprising an epoxy resin, a hardener, a hardening accelerator, a binder and a graphite powder as essential components.

For better homogenizing of the components, the molding material of the present invention is prepared in accordance with the following procedure. First, the epoxy resin, the hardener, the hardening accelerator and the binder are dissolved in acetone. Then, a graphite powder is mixed with the solution to obtain a slurry. Thereafter, the slurry is dried and ground to prepare the final molding material.

According to the method of the present invention, the graphite powder is preferably used in an amount of from 400 to 2,200 parts by weight, based on 100 parts by weight of the epoxy resin. It is preferred that the graphite powder is a planar expanded powder. The particle size of the graphite powder is dependent upon the application and characteristics of the graphite powder, but is preferably in the range between 0.005 and 0.15 mm in the method of the present invention.

Examples of suitable resins that can be used in the method of the present invention include phenol resins, unsaturated polyester resins (hereinafter, referred to as "UPE") and epoxy resins. Of these, epoxy resins are most preferred. The hardener is used to harden the epoxy resin. As suitable hardeners, there may be used amine-based and acid anhydride-based hardeners. Acid anhydride-based hardeners are most preferred. According to the method of the present invention, the hardener is preferably used in an amount of from 30 to 85 parts by weight, based on 100 parts by weight of the epoxy resin.

The hardening accelerator serves to shorten the hardening time of the epoxy resin by the action of the hardener. Triphenyl phosphine (hereinafter, referred to as "TPP") can be used as the hardening accelerator. The amount of the TPP used is preferably in the range of from 0.3 to 6 parts by weight, based on 100 parts by weight of the epoxy resin.

The binder functions to enhance the binding characteristics between the graphite powder and the resin. As the binder, a silane can be used. The binder is preferably used in an amount of from 0.3% to 6% by weight, based on the graphite powder.

For better homogenizing of the components, the epoxy resin, the hardener, the hardening accelerator and the binder are dissolved in acetone and are then mixed with the graphite powder using a mixer where both revolution and rotation are simultaneously performed.

For better homogenizing of the polymer material and the other additives, the solvent (i.e. acetone) is evaporated by allowing the mixture to stand in a vacuum oven at 30~60° C. for 1~6 hours, followed by drying and grinding, to prepare the final molding material for a fuel cell separator.

The present invention will now be described in more detail with reference to the following examples.

EXAMPLE 1

1,200 parts by weight of a graphite powder, 50 parts by weight of an acid anhydride-based hardener, and 1 part by weight of TPP as a hardening accelerator were added to 100 parts by weight of an epoxy resin. Silane as a binder was added in an amount of 1% by weight, based on the graphite powder. At this time, planar expanded graphite having an average particle diameter of 0.05 mm was used as the graphite powder.

For homogeneous mixing, the epoxy resin, the hardener, the hardening accelerator and the binder were dissolved in acetone, and then the graphite powder was mixed with the solution using a mixer where both revolution and rotation are simultaneously performed.

After the addition, the mixture was allowed to stand in a vacuum oven at 50° C. for 3 hours to evaporate the acetone. The dried mixture was then subjected to compression molding to produce a separator (hereinafter, referred to as an "inventive separator").

COMPARATIVE EXAMPLE 1

A graphite powder in a spherical form having the same particle size as the graphite powder used in Example 1 and a thermosetting powdery resin were dry-mixed, and then the mixture was subjected to compression molding to produce a separator (hereinafter, referred to as a "conventional separator"). At this time, the mixing ratio between the polymer material to the graphite powder and the conditions for the compression molding were the same as in Example 1.

FIGS. 1 to 4 are graphs comparing the physical properties, i.e. gas permeability (FIG. 1), electrical conductivity (FIG. 2), flexural strength (FIG. 3) and density (FIG. 4), of the inventive separator and the conventional separator.

As can be seen from FIG. 1, the inventive separator (Example 1) shows a lower gas permeability than the conventional separator (Comparative Example 1). The results in FIGS. 2 and 3 indicate that the inventive separator (Example 1) shows much higher electrical conductivity and flexural strength than the conventional separator (Comparative Example 1). As is evident from the graph shown in FIG. 4, the inventive separator (Example 1) has a higher density than the conventional separator (Comparative Example 1). Further, the standard deviation bars shown in FIG. 4 demonstrate that the inventive separator (Example 1) shows better uniformity of physical properties than the conventional separator (Comparative Example 1).

As apparent from the above description, the fuel cell separator, which is produced from the molding material prepared by the method of the present invention, shows very low gas permeability, superior electrical conductivity, sufficient strength, and maximized uniformity throughout the overall structure of the finished product.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preparing a molding material for a fuel cell separator, comprising:
   dissolving epoxy resin, a hardener, and a hardening accelerator with silane as a binder in acetone as a solvent to obtain a solution;
   then adding graphite powder to said solution and mixing to obtain a mixture;
   drying said mixture at 30 to 60° C. for 1 to 6 hours to obtain a dried mixture; and
   grinding said dried mixture, wherein
      said hardener is an acid anhydride-based compound,
      said hardener is used in an amount of 30 to 85 parts by weight per 100 parts by weight of epoxy resin,
      said hardening accelerator is triphenyl phosphine,
      said hardening accelerator is used in an amount of 0.3 to 6 parts by weight per 100 parts by weight of epoxy resin,
      said graphite powder is a planar expanded graphite powder having a particle size between 0.005 and 0.15 mm, and
   the mixing is carried out using a mixer where revolution and rotation are simultaneously performed.

2. The method according to claim 1, wherein the graphite powder is used in an amount of from 400 to 2,200 parts by weight based on 100 parts by weight of the epoxy resin.

3. The method according to claim 1, wherein said drying at 30 to 60° C. for 1 to 6 hours is done under vacuum.

4. The method according to claim 1, wherein the silane is used in an amount of from 0.3% to 6% by weight based on the weight of graphite powder.

5. A molding material for a fuel cell separator prepared by the method according to claim 4.

6. A fuel cell separator comprising a molding formed from the molding material according to claim 5.

7. A fuel cell comprising the fuel cell separator according to claim 6.

\* \* \* \* \*